April 23, 1963  J. O'NEILL  3,087,140
ULTRASONIC VEHICLE DETECTION SYSTEM
Filed June 20, 1960  7 Sheets-Sheet 1
FIG. IA.
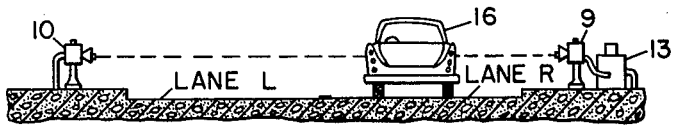
FIG. IB.
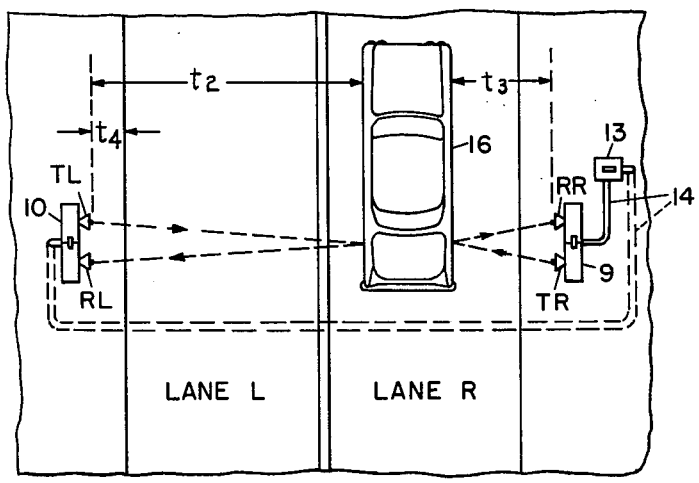
FIG. IC.
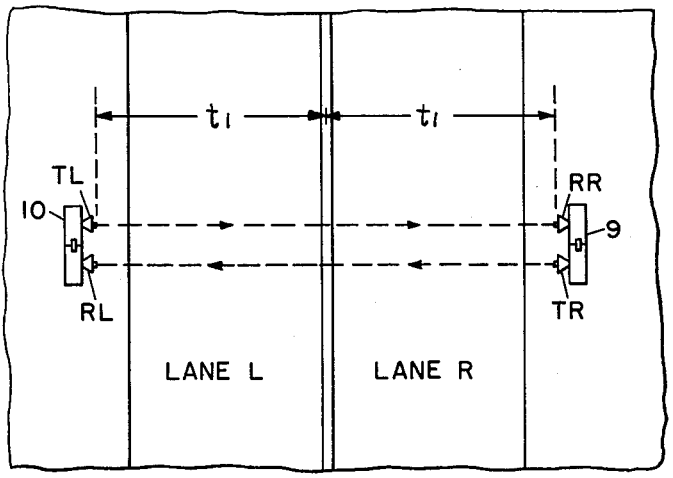
INVENTOR.
J. O'NEILL
BY Forest B. Hitchcock
HIS ATTORNEY

INVENTOR.
J. O'NEILL
BY
HIS ATTORNEY

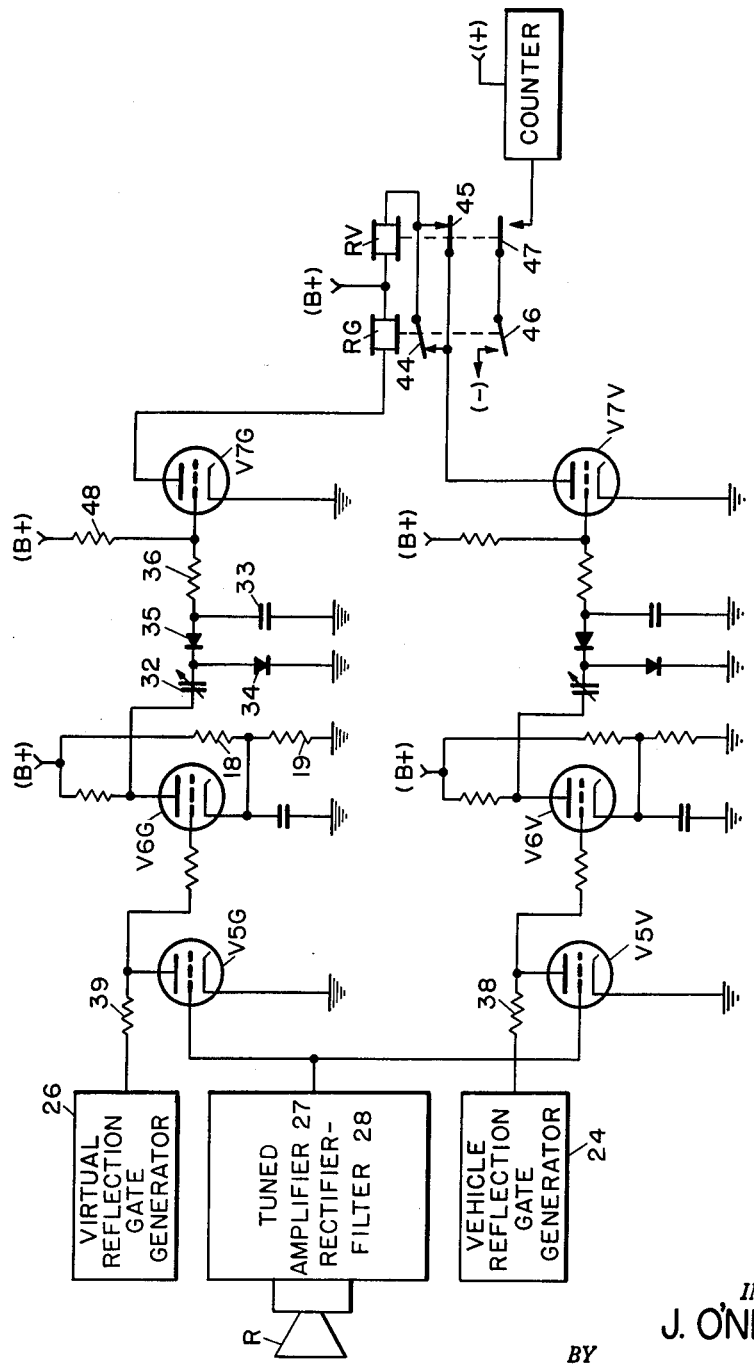

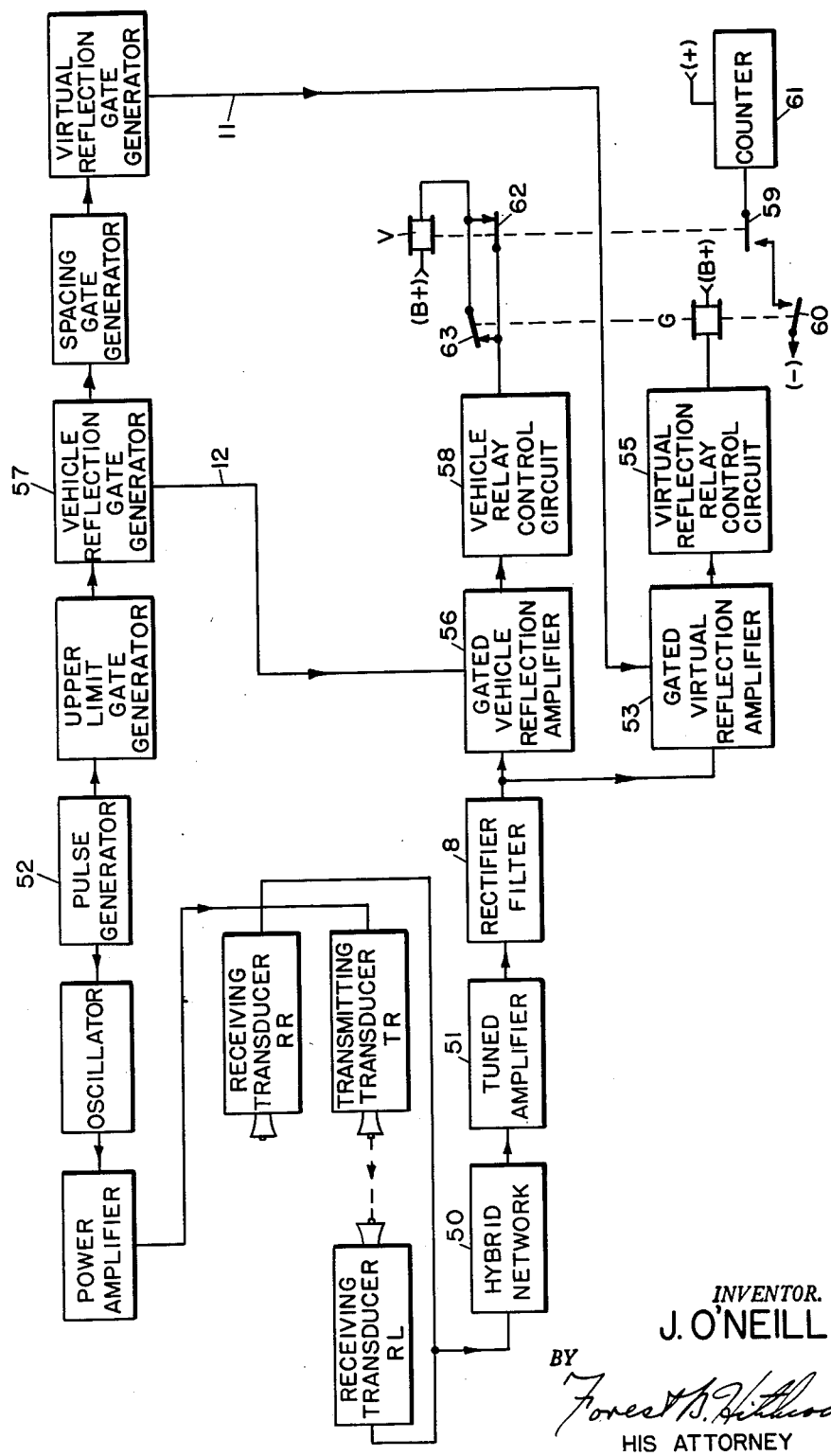

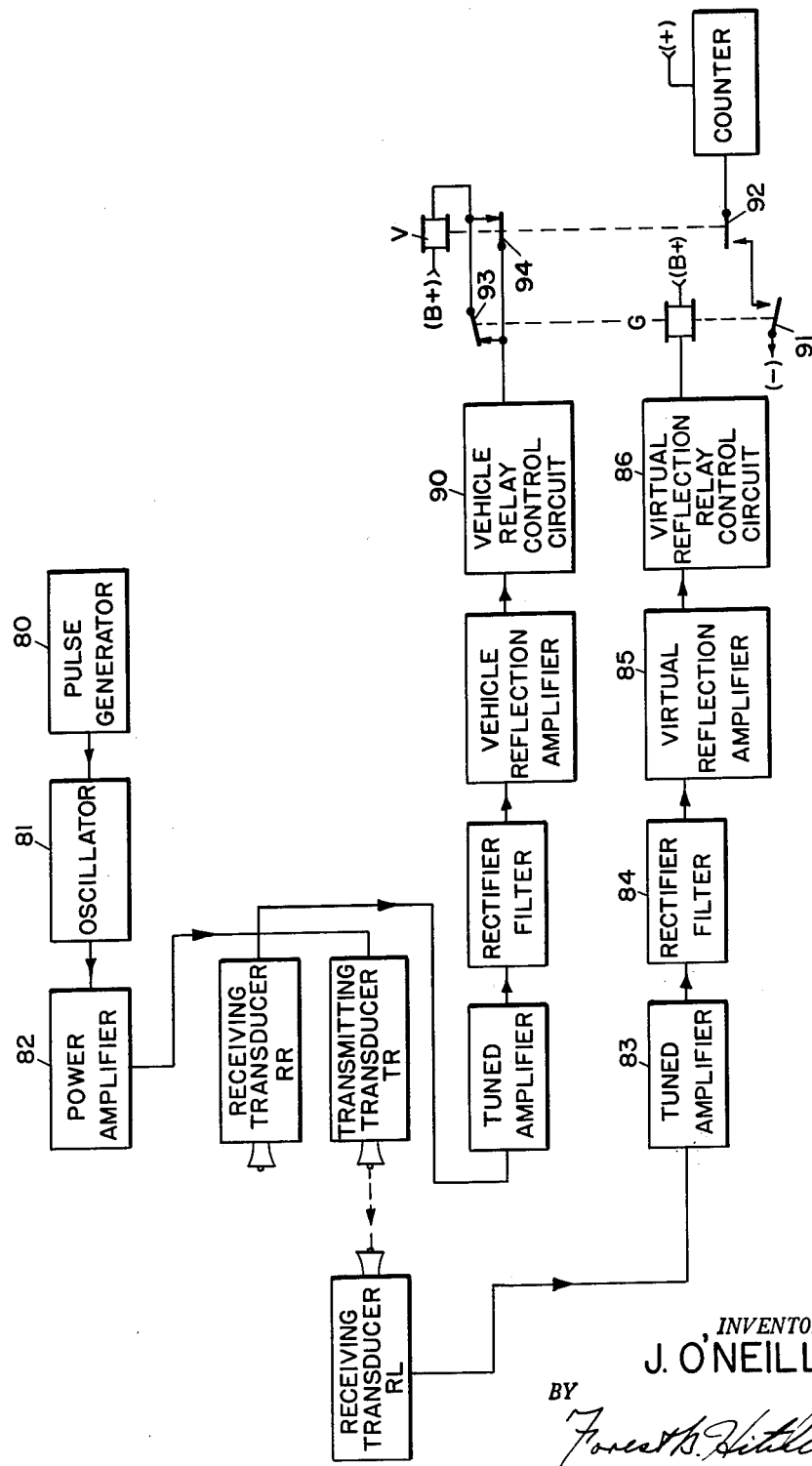

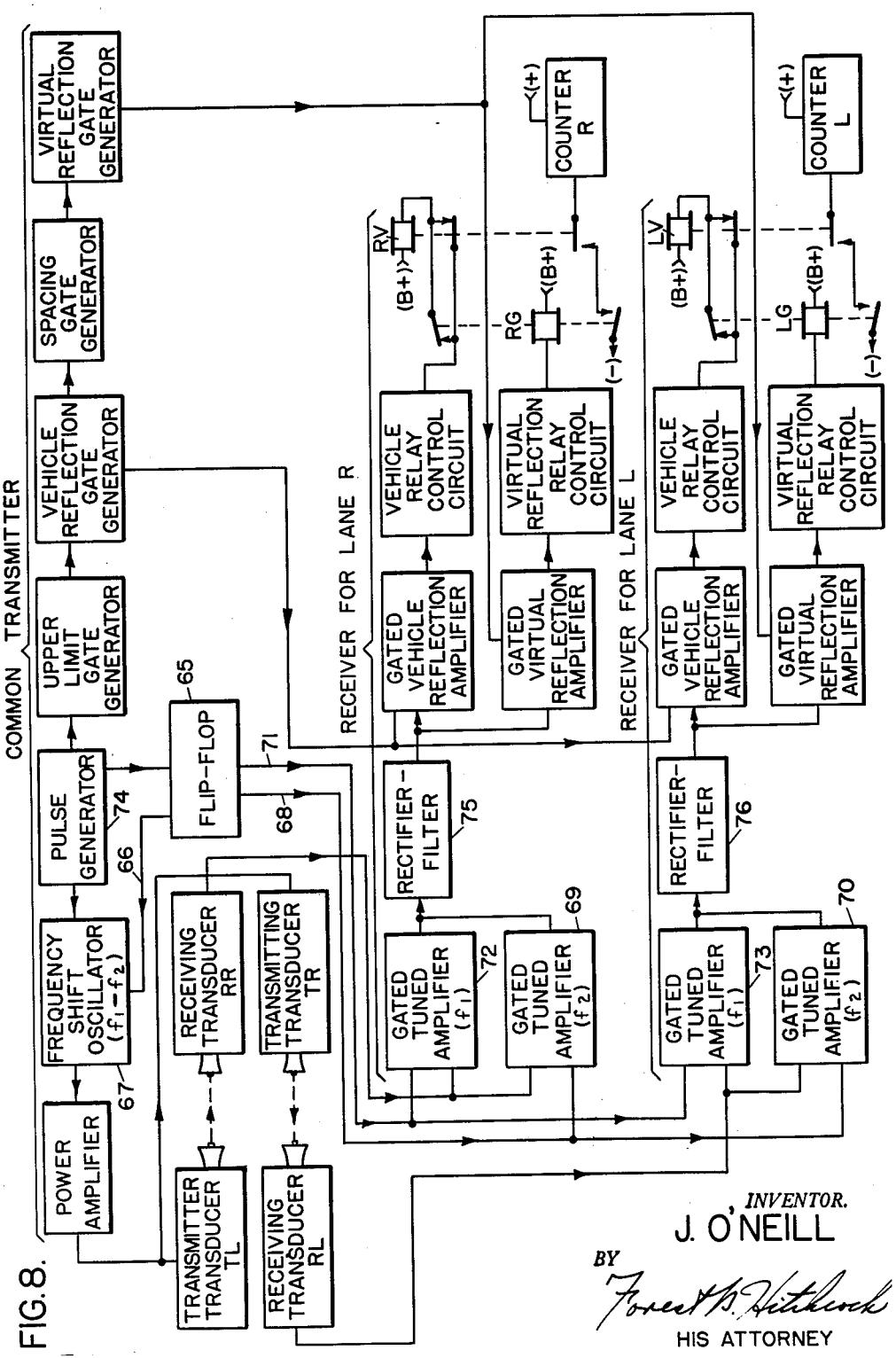

United States Patent Office 3,087,140
Patented Apr. 23, 1963

3,087,140
ULTRASONIC VEHICLE DETECTION SYSTEM
Jerome O'Neill, Rochester, N.Y., assignor to General
Railway Signal Company, Rochester, N.Y.
Filed June 20, 1960, Ser. No. 37,165
16 Claims. (Cl. 340—38)

This invention relates to the detection of objects and especially vehicles and more particularly pertains to such systems wherein the objects or vehicles are detected as a result of the effects produced by their passing through a beam of sound energy. This invention is analogous in subject matter to and an improvement over what is disclosed and claimed in the prior applications of H. C. Kendall et al., Serial No. 808,736, filed April 24, 1959, now U.S. Patent 3,042,303 and Serial No. 820,691, filed June 16, 1959, now U.S. Patent 3,042,899; the application of N. A. Bolton, Serial No. 841,389, filed September 21, 1959; and also the applications of M. A. Polster, Serial No. 845,810, filed October 12, 1959, now U.S. Patent 3,030,608 and Serial No. 849,326, filed October 28, 1959, now U.S. Patent 3,046,519; all of which prior applications are assigned to the assignee of the present invention.

In the systems disclosed in these prior applications, a beam of repetitive sound pulses is transmitted across the path of each object or vehicle. A receiver is provided which includes a sound transducer, and this receiving transducer is so positioned and directed that it receives and is responsive to the transmitted sound energy upon its reflection from the surface of the object or vehicle as it intercepts the transmitted sound beam. The transmitted sound beam is additionally so directed and the receiving transducer so positioned that, in the absence of any vehicle, the transmitted sound energy is reflected from a fixed reflecting surface to the receiving transducer. Such an arrangement may readily be provided by positioning both transmitting and receiving transducers over a lane of traffic and directing both downwardly so that the transmitted sound beam is transmitted toward and reflected from the tops of passing vehicles back towards the receiving transducer. When no vehicle is present, the sound pulses are instead reflected from the pavement back toward the receiving transducer. Thus, for each transmitted sound pulses the receiving transducer receives a reflected sound pulse from the pavement when no vehicle is present, but instead receives a reflected sound pulse from the top of each passing vehicle when a vehicle is present in the sound beam.

Because of the considerably longer propagation time that is involved when a reflection is received from the pavement as compared to a reflection received from the top of a passing vehicle, each pavement reflection pulse is received at a later time with respect to the transmitted pulse than is the vehicle reflection pulse. It should be mentioned here that the repetition rate of the transmitted sound pulses is made sufficiently slow to permit each sound pulse to be received by the receiving means following its reflection from an object or vehicle within the designated detection zone prior to the transmission of the next sound pulse. This requirement eliminates ambiguity since it relates each reflected pulse definitely to the last transmitted pulse. Electronic gating circuits are used which demarcate successive time intervals following the transmission of each sound pulse, and these gating circuits make it possible to distinguish a pavement reflection from a vehicle reflection.

A high degree of accuracy in object detection is achieved in these prior systems by the ability to discriminate between the desired objects or vehicles to be counted and other extraneous objects, and this is brought about, in part, by so organizing the system that a single count can be registered only by going through a prescribed cycle of events. Such cycle comprises: first, when the vehicle enters the sound beam, the reception of reflections from the top of the passing vehicle concurrently with the interruption of sound reflections from the pavement; and, when the vehicle leaves the sound beam, the re-establishment of reflections from the pavement concurrently with the cessation of vehicle reflections. The requirement that there be a re-establishment of reflections from the pavement indicates positively the departure of the object or vehicle from the detection zone. The requirement that these conditions all be met to register the presence of a vehicle is of considerable effect in eliminating spurious responses of the system which might otherwise result from the passage of people or animals through the detection zone, and also provides that a vehicle having a plurality of sound reflecting surfaces spaced by non-reflecting surfaces (a convertible car, for example) will be counted as a single vehicle rather than as two separate vehicles corresponding to each of its sound reflecting surfaces. These characteristics are explained in considerable detail in the previously mentioned Kendall et al. application, Ser. No. 808,736.

There are numerous instances, however, where it is not practical to position the receiving and transmitting transducers overhead and direct them downwardly toward the pavement. Where this condition is present, but it is nevertheless still desired that the high degree of discrimination afforded by the normal reception of pavement reflections be retained, it may in certain circumstances be possible to resort to the system disclosed in the previously mentioned application Ser. No. 820,691. In this prior application, it is set forth that the receiving and transmitting transducers may be so positioned and directed that the sound beam is transmitted substantially horizontally across the path of the object or vehicle. A fixed surface having sound reflecting characteristics is then placed opposite the transducers so that, when no object or vehicle is present, the sound beam emanating from the transmitting transducer will be reflected toward the receiving transducer. This expedient may at times be used but is ordinarily not a practical solution to the problem when it is desired to detect vehicles passing along a highway because it may not be possible to position a sound reflecting surface along the far edge of the highway. This is especially true when there is more than one lane of traffic side-by-side because then the reflecting surface would have to be in the middle of the highway.

In order to overcome these drawbacks, the present invention contemplates that two units, each comprising a transmitting and a receiving transducer, will be positioned opposite each other along the opposite edges of the highway. Each transmitting transducer is so positioned and directed with respect to the receiving transducer on the opposite side of the highway that each sound pulse emitted by a transmitting transducer will be received by the receiving transducer on the opposite side. Preferably, both transmitting transducers are energized at the same time. Therefore, with no vehicle on the highway between the two transducer locations, two beams of sound pulses are continually transmitted across the highway, one going in one direction and the other in the opposite direction. As will more fully be described later, the effect of this arrangement is equivalent to providing a fixed reflecting surface in the middle of the highway, midway between the two transducer locations.

As soon as the bound beams are intercepted by a vehicle, each receiving transducer is prevented from receiving sound pulses from the opposite transmitting transducer. Instead, each receiving transducer then receives reflections from the near surface of the vehicle of sound pulses originating with the transmitting transducer on the same side of the highway. If two vehicles, one in each lane, simultaneously occupy the space between the opposite transducer locations, then each receiving transducer receives sound pulse reflections from the vehicle in the nearby lane. Therefore, although the system may be used for registering the passage of vehicles along a single highway lane, it may equally well be used for independently registering vehicles moving along both lanes of a dual-lane highway.

This brief description makes it apparent that this invention also provides a considerable advantage when it is desired to register the passage of vehicles through a relatively wide single or dual-lane passageway. Thus, when the transducers are mounted overhead in a wide passageway as shown, for example in the above-mentioned Bolton application Ser. No. 841,389, they must ordinarily be quite closely spaced so that it will not be possible for a vehicle to pass through a "dead spot" between adjacent beams and thus not be detected. Furthermore, the "spread" of each beam must also be limited to that a vehicle will be able to cut off pavement reflections fully, and this factor, too, tends to increase the number of transducers that must be placed overhead, in a row, across a wide passageway. However, in contrast, this invention requires the use of only a single pair of transmitting and receiving transducers along each side of the highway or passageway.

When no vehicle is present, each receiving transducer receives sound pulses from across the highway, and these pulses have a long propagation path as compared to the vehicle reflection pulses each such transducer receives when a vehicle is present. Nevertheless, the sound pulses travelling the width of the highway are "direct" pulses, coming directly from the opposite transmitting transducer. They thus impinge upon the receiving transducer with a greater amplitude than would similar sound pulses which had travelled the same distance but had been subject to reflection during their travel rather than travelling directly between the transmitting and receiving transducers. This phenomenon permits the use of the vehicle detection system of this invention even when the highway or passageway for the vehicle is of considerable width.

Two alternative embodiments of this invention are also disclosed which are particularly adopted for registering the passage of vehicles along a single lane. In these embodiments, receiving transducers are positioned along each side of the highway lane, but only a single transmitting transducer is used and is positioned adjacent one of the two receiving transducers. When no vehicle is present, the transmitted beam of sound pulses is received by the opposite receiving transducer, but when a vehicle intercepts this beam the sound pulses are instead reflected from the vehicle and are received by the recurring transducer which is adjacent the transmitting transducer. This change in conditions is detected and results in the registration of the vehicle.

A further embodiment is disclosed wherein successive sound pulses are alternately of two different frequencies and each receiver is responsive in the interval following the transmission of a pulse of one particular frequency only to reflections which are of that particular frequency. As will later be described in detail, this permits the use of a higher pulse rate so that registration of vehicles travelling at higher speeds can be obtained.

It is, therefore, an object of this invention to provide a vehicle detection system wherein vehicles are registered as a result of the effects produced on a beam of sound energy directed across their path but wherein only two sets of sound transducing means is required regardless of the width of the defined path over which such vehicles travel.

It is a further object of this invention to provide a system for the detection of vehicles wherein a high degree of counting accuracy is provided but without requiring that the sound transducers employed in the system be mounted overhead the highway lanes being traversed.

It is another object of this invention to provide a sonic vehicle detection system wherein both receiving and transmitting transducers are positioned on each side of the path being traversed by the vehicles and wherein each transmitting transducer normally directs its beam toward the receiving transducer opposite it.

Another object of this invention is to provide a sonic vehicle detection system having the advantages herein set forth but being adapted particularly for the detection of vehicles in a single lane.

Still another object of this invention is to provide a sonic vehicle detection system in which two sound beams are transmitted in opposite directions across the path of the vehicles and with successive sound pulses constituting said beam being alternately different frequencies.

Other objects, purposes and characteristic features of this invention will in part be obvious from the accompanying drawings and in part pointed out as the description of the invention progresses.

To simplify the illustrations and facilitate in the explanation of the invention, various parts and circuits which constitute the embodiment thereof are shown diagrammatically and certain conventional elements are disclosed in block form. The drawings have been made more with the purpose of making it easy to understand the principles and mode of operation than to illustrate the specific construction and arrangement of parts that might be used in practice. The symbol (B+) and the symbol for a ground indicate connections to the opposite terminals of a source of relatively high voltage suitable for the operation of various electron tubes, and the symbols (+) and (−) indicate connections to the opposite terminals of a source of lower voltage suitable for the operation of various relays, counters, and the like.

In describing the invention in detail, reference will be made to the accompanying drawings in which like reference characters designate corresponding parts throughout the several views and in which:

FIGS. 1A, 1B and 1C indicate a typical dual-lane highway with transducer units, each comprising both a transmitting and receiving transducer, on opposite sides of the highway;

FIG. 5 is a circuit drawing illustrating the control of the various relays and the gated amplifier circuits;

FIGS. 6 and 7 illustrate modifications of this invention which are particularly adapted for the detection of vehicles moving along a single lane; and FIG. 8 illustrates still another modification of this invention in which successive sound pulses transmitted from the opposite transducers are caused to be of alternately different frequencies.

Figure 2:
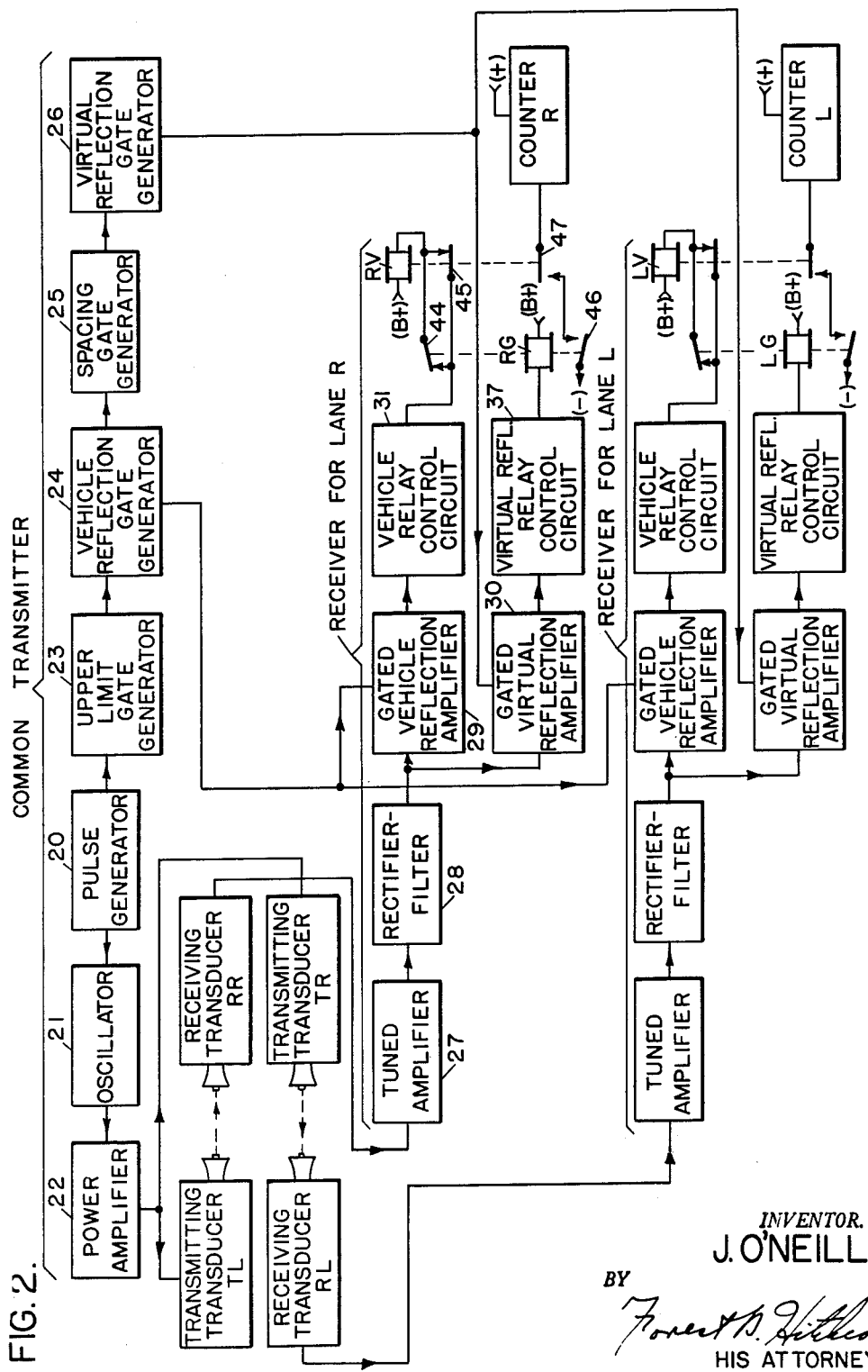
FIG. 2 is a block diagram illustrating the system of the present invention for the detection of vehicles.

FIGS. 1A, 1B and 1C show a typical dual-lane highway. The two lanes, designated as lane L and lane R for the left and right-hand lanes respectively, may accommodate vehicles in opposite directions or, equally well, in the same direction as when the two lanes shown are part of a four-lane highway. Also, although two lanes are shown, the system applies equally well to a single lane highway as will become clear from the description that follows.

FIG. 1A shows two transducer units 9 and 10 positioned along opposite sides of the highway. These units are so placed that a beam of sound directed from one to the other is at such a height above the roadway that it will be intercepted by a passing vehicle such as the auto 16. FIGS. 1B and 1C further illustrate that the two units 9 and 10 are positioned directly opposite each other and that each unit such as the unit 9 includes both receiving and transmitting transducers. The transmitting and receiving transducers associated with the unit 9 along the right-hand lane R are designated TR and RR, respectively. Corresponding reference characters TL and RL, are provided for the transducers included in unit 10. FIG. 1C also illustrates that when no vehicle is present, the sound beam emanating from each transmitting transducer is received by the receiving transducer of the opposite unit. FIG. 1B, on the other hand, illustrates that when a vehicle is present in the zone between the opposite units, the sound beam transmitted by each transmitting transducer impinges upon a passing vehicle and then is reflected back toward the receiving transducer on the same side. If two vehicles are present, one in each lane and between the two units 9 and 10, then each transmitted beam is reflected from the respective vehicle back toward the receiving transducer on the same side. For example, if it is assumed that there is another vehicle present in lane L of FIG. 1B and occupying a position similar to that occupied by the vehicle 16, then the sound beam transmitted from the transducer TL will not impinge upon vehicle 16 but will instead impinge upon such vehicle present in lane L and be reflected back toward the receiving transducer RL.

FIGS. 1A and 1B further illustrate an equipment case 13 which houses transmitting and receiving apparatus required for the system. As shown, this equipment case 13 houses apparatus associated with both the transducer units 9 and 10 and connected to them by the cable 14. Where the equipment case 13 is mounted along one side of the highway, the connection to the transducer unit on the opposite side of the highway may be by means of a cable which is imbedded within the pavement itself as FIG. 1B illustrates.

To aid in clarifying the description of this invention, it is believed desirable to describe first, in general terms, the manner of operation of a system such as is disclosed in the previously mentioned Kendall et al. application, Ser. No. 808,736. In such system, both the transmitting and receiving transducers are preferably positioned over the top of the highway and both are directed downwardly toward the pavement. When no vehicle is present, each transmitted pulse emanating from the transmitting transducer impinges upon the pavement and then is reflected back toward the receiving transducer. When a vehicle enters the sound beam, each transmitted sound pulse is then prevented from impinging upon the pavement and instead it impinges upon various sound reflecting surfaces of the vehicle such as its hood, roof, trunk, and the like. Such reflections are similarly reflected back toward the receiving transducer. Of course, sound pulse reflections which are received from the uppermost reflecting surfaces of the vehicle have a considerably shorter round-trip propagation time than do those sound pulses which are reflected from the pavement when no vehicle is present.

The receiving apparatus includes various electronically timed gating circuits which make it possible to distinguish between the pavement reflection pulses and the vehicle reflection pulses on the basis of their different time of arrival at the receiving transducer. Therefore, whereas the receiving circuits associated with the receiving transducer normally provide one kind of output signal when only pavement reflections are received, such output signal is terminated when a vehicle is present and instead a different output signal is produced and this signal is produced by the vehicle reflections. In one specific embodiment illustrated in the prior application, Ser. No. 808,736, a relay is provided which is selectively controlled according to the presence or absence of the particular signal which is dependent upon the reception of vehicle reflections. Another relay is similarly controlled according to the presence or absence of the signal dependent upon the pavement reflections. As is disclosed in considerable detail in such prior application, a high degree of discrimination between vehicles and other objects not desired to be counted as well as other extraneous signals is obtained by requiring, in order that a vehicle be registered, that both these relays be operated in a prescribed manner. Thus the first-mentioned relay must operate to the condition it assumes when vehicle reflections are being received and also the second relay must operate to the condition it assumes when pavement reflections are not received. There is also the additional requirement that the original conditions be restored before vehicle registration is complete and before another vehicle can be registered, i.e., both relays must operate to those positions which indicate that vehicle reflections are no longer received but that pavement reflections are again being received.

With this description of the operation of the prior system in mind, attention will now be directed to the system of this invention, and it will be shown that practically identical results are achieved and the same high degree of discrimination provided even though there is no fixed reflecting surface present upon which sound pulses may normally impinge when no vehicle is present.

Reference will first be made to FIG. 1C to describe the operation of the system when no vehicle is present within the detection zone. Assuming that both transducers TL and TR simultaneously transmit a sound pulse, the receiving transducers RL and RR will both receive a sound pulse prior to the transmission of the next sound pulse by the two transmitting transducers. In other words, if the time required for a sound pulse to travel from the transmitting transducer to the center of the highway is $t_1$, as indicated in FIG. 1C, then the period between successive pulses is made to exceed at least twice this time, or $2t_1$, and is preferably even longer ($2t_2$ approximately) as will subsequently be described. Upon the simultaneous transmission of sound pulses by the two transmitting transducers TL and TR, the two respectively opposite receiving transducers, RR and RL, receive such pulses at a time $2t_1$ later. The effect upon each receiving transducer and especially on the associated receiving circuits is exactly the same as if the received pulse had been transmitted by the transmitting transducer on the same side of the highway and reflected from a fixed or "virtual" reflecting surface located midway between the two transducer locations. The reason for this is that the delay in receiving the pulse following its transmission from the opposite transducer is the same that would be incurred if a pulse sent from the adjacent transmitting transducer were reflected from a fixed reflecting surface in the middle of the road back to the receiving transducer since the total time of propagation for such a reflected pulse would also equal $2t_1$. To summarize, the effect is that when no vehicle is present, each receiving transducer receives a sound pulse at a time $2t_1$ after the transmission of sound pulses by both transmitting transducers and, although this received pulse actually emanates from the transmitting transducer on the opposite side of the highway, the effect is exactly the same as if that pulse had originated with the transmitting transducer in the same unit and were reflected from a fixed reflecting surface exactly in the middle of the highway.

When one or more vehicles are present in the detection zone between the two detecting units, the manner of operation becomes quite different since each receiving transducer is then blocked from receiving sound pulses from the directly opposite transmitting transducer. Instead, each receiving transducer can then receive sound pulses only from the associated transmitting transducer on the same side of the highway. For example, the receiving transducer RR included in unit 9 at the edge of the right-hand lane R of FIG. 1B can then receive sound pulses only from the associated transmitting transducer TR but not from the opposite transmitting transducer TL. As to the sound pulses traveling over a reflection path between the transducers TR and RR, the propagation time of each pulse is now much shorter, if the distance from the transducers to the nearest side of the vehicle is $t_3$ as shown in FIG. 1B, then each received sound pulse will occur an interval $2t_3$ after its transmission by transducer TR. The various receiving circuits associated with transducer unit 9 are able to detect this reception of pulses having a shorter propagation time as compared to the normal condition, and these circuits are so organized that the continued reception of such pulses with the shorter propagation time, along with the cessation of the normally received pulses having an apparent propagation time of $2t_1$, indicates the presence of a vehicle within the detection zone. However, the registration of the passage of a vehicle is only completed when reflection pulses with the shorter propagation time $2t_3$ no longer occur but instead the normally received pulses having the longer propagation time $2t_1$ again occur. From this description, it is apparent that the registration of vehicles passing through the detection zone is entirely analogous with that disclosed in the prior Kendall et al. application Ser. No. 808,736, so that the same high degree of differentiation and same accuracy of counting is achieved.

With respect to the unit 10 which is adjacent the left-hand lane L of FIG. 1B, the receiving transducer of such unit RL is, of course, also precluded from receiving pulses from the directly opposite transmitting transducer TR, and instead this transducer RL now receives pulses which originate with the transmitting transducer TL and are reflected from the near side of the vehicle 16. If the distance from the transducers to such near side is $t_2$ as indicated in FIG. 1B, then the propagation time of such pulses in their travel from the transmitting to the receiving transducers is $2t_2$ and this time is substantially longer than the time $2t_1$ which exists when no vehicle is present. This longer-than-normal propagation time is also detected by the receiving circuits associated with the transducer unit 10 and no vehicle registration occurs as a result of this condition.

However, if it should happen that another vehicle occupies lane L in approximately the same position as does vehicle 16 in lane R, then the sound pulses transmitted by transducer TL will be reflected from the nearest side of such other vehicle and will then impinge upon the receiving transducer RL. Each such sound pulses will have a short propagation time, substantially in the order of $2t_3$ as shown for lane R, and because of this a separate distinctive output will be provided by the receiving circuits associated with transducer RL to indicate the presence of such vehicle in lane L. The vehicles in the different lanes will thus be separately registered, and it is immaterial whether they pass separately or simultaneously through the detection zone.

A block diagram of the vehicle detection system of this invention is shown in FIG. 2. A pulse generator 20 produces repetitive electrical output pulses whose frequency determines the repetition rate of sound pulse transmission. Each output pulse acts upon the oscilaltor 21, causing it to generate a short pulse of electrical energy preferably at an ultrasonic frequency. These output pulses of the oscillator 21 are then applied to a power amplifier 22 where they are considerably amplified in magnitude before being transferred to the two transmitting transducers TL and TR. As is also shown in this FIG. 2, each transmitting transducer is so positioned and directed relative to the receiving transducers that, in the absence of a vehicle, each transmitted sound pulse will impinge upon the receiving transducer on the opposite side of the highway. But, as is more clearly shown in FIGS. 1A, 1B, and 1C, each transmitted sound pulse will instead impinge upon a vehicle when it is present within the detection zone and cause the sound pulse thus reflected to be received by the receiving transducer on the same side of the highway.

Each output pulse of the pulse generator 20 is also applied to the upper limit gate generator 23. As is clearly shown in FIG. 3, each output pulse of the pulse generator initiates a timing operation with respect to this upper limit gate generator 23, causing it to demarcate a predetermined time interval. This time interval is one wherein both of the receivers for the respective lanes are rendered inoperative in that they do not provide an output in response to any pulse received at such time. The reason for this is that the length of time demarcated by the upper limit gate generator is equal to $2t_4$ and, as FIG. 1B indicates, no bona fide vehicle reflection pulse can possibly be received within this short time period following the transmission of the sound pulse. By having the receiver ineffective to supply an output throughout this time interval, it is ensured that there can be no response to spurious sound energy received within this time.

Figure 4:
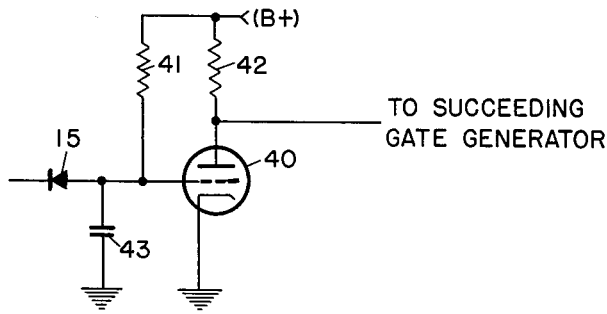
FIG. 4 illustrates a typical gate generator circuit.

FIG. 2 further illustrates a series of gate generators, each one supplying its output as an input to the next succeeding one. Each of these comprises a timing circuit which provides a relatively high positive output voltage during the particular interval it demarcates. A typical timing circuit which may be used for one of the gate generators is illustrated in FIG. 4. The circuit comprises a triode tube 40 whose control grid and plate are both connected to the (B+) terminal through resistors 41 and 42 respectively. The control grid is also connected to ground through capacitor 43. Square wave input pulses are applied to the control grid through a rectifier 15. A positive-going variation in voltage at the input circuit to this gate generator has substantially no effect upon the grid circuit because the high back resistance of rectifier 15 substantially prevents conduction in response to said positive-going voltage variation. On the other hand, upon each occurrence of a negative-going voltage variation, a negative charge is placed across the grid circuit capacitor 43 and drives the grid of this tube substantially below cut off. The plate voltage of tube 40 is normally at a relatively low value because the connection of the grid to the (B+) terminal through resistor 41 ensures that the tube is normally fully conductive so that there is a large voltage drop across the plate resistor 42. However, when capacitor 43 becomes negatively charged and cuts this tube off, the plate potential rises abruptly. It remains at such high value for a length of time dependent upon the time constant for the discharge of capacitor 43. As this capacitor discharges exponentially through resistor 41, there is a resulting rise of grid voltage until finally the grid potential is raised sufficiently to permit the tube to conduct. When this happens, there is a decline in plate voltage, thereby indicating the termination of the positive gating voltage.

Figure 3:
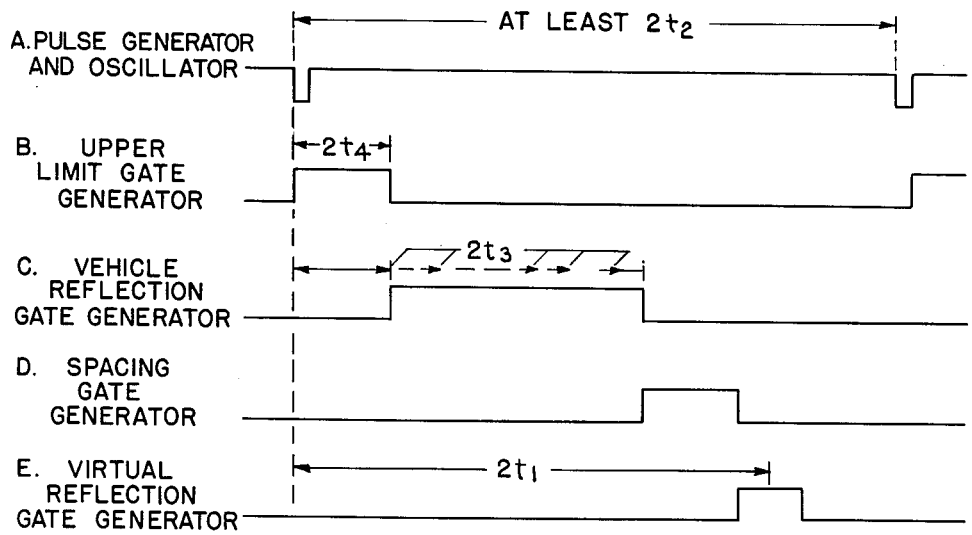
FIG. 3 is a timing circuit diagram illustrating various time relationships involved in the various gating circuits of this invention.

The decrease in gating voltage occurring at the end of the demarcated interval, initiates the timing operation of the next successive gate generator and so on. Thus, as the timing diagram of FIG. 3 illustrates, when the voltage provided by the upper limit gate generator 23 is restored, this action initiates a timing operation by the vehicle reflection gate generator 24 as shown in line C. Upon the restoration of the voltage level at line C, a timing operation is then initiated with respect to the spacing gate generator 25 of FIG. 2, and at the end of this time interval, a further timing operation is effected by the virtual reflection gate generator 26. Thus, a series of different successive time intervals is demarcated by successive gate generators in the manner shown in FIG. 3.

The function of the upper limit gate generator 23 has already been described. The vehicle reflection gate generator 24 demarcates a time interval which encompasses the expected time of reception of reflections from a vehicle in the adjoining lane of the highway. As shown in FIG. 1B, the propagation time of such a sound pulse is $2t_3$ but it is apparent that $t_3$ may vary rather considerably dependent upon whether the car travels in the right-hand portion of lane R so that it is close to the transducers of unit 9 or whether it travels instead more toward the center of the highway so that the distance $t_3$ becomes longer. It is for this reason that the gate demarcated by the vehicle reflection gate generator 24 is required to have a rather substantial duration so that reflection pulses from the vehicle will be properly received.

As can be seen by comparing FIGS. 1B and 1C, there is a rather substantial difference in time between times $t_1$ and $t_3$ and, therefore, the virtual reflection gate generator 26 of FIG. 2, whose output is intended to encompass the time of reception of the sound pulse from the transmitting transducer across the highway, must generate its output gate voltage at a substantial time after the end of the gate demarcated by the vehicle reflection gate generator. On the other hand, the sound pulses received from the transducer on the opposite side of the highway are always received with a fixed delay following their transmission and therefore the length of the gate demarcated by the virtual reflection gate generator 26 need not be of long length. For this reason, its is desirable to provide a gating output by this gate generator 26 of rather short duration but to separate it from that of the vehicle reflection gate generator by the required amount. This is accomplished by providing a spacing gate generator 25 which demarcates an interval of time between the vehicle reflection gate and the virtual reflection gate as shown in FIG. 3.

A vehicle in one lane of the highway is not registered by the receiving apparatus associated with the transducer unit along the edge of the opposite lane. As FIG. 1B illustrates, time $t_2$ is substantially greater than time $t_3$, even for maximum values of time $t_3$. Therefore, sound pulses originating with transducer TL, reflected from vehicle 16 in lane R, and received by transducer RL, have such a long round-trip propagation, $2t_2$, that they cannot fall within the time of occurrence of the vehicle gate, and are, therefore, not recognized as bona fide vehicle reflection pulses.

If vehicle 16 should move with its left-hand side along the middle of the highway, then sound pulses reflected from its left-hand side would have a round-trip propagation time of $2t_1$ and would fall within the virtual reflection gate. This in no way adversely affects operation of the system since the vehicle relay RV will still not be actuated.

In the general description given previously, it was stated that the period between successive transmitted sound pulses may be approximately equal to $2t_2$. This ensures that there will be a sufficient interval between successive pulses to permit even reflections from a vehicle in the far lane to be received before the next pulse is transmitted. Although this does result in some slowing of the maximum repetition rate, it guards against the possibility that such a long delayed pulse will fall within the vehicle gate occurring after the next transmitted pulse and thus be erroneously identified as being a bona fide vehicle reflection pulse.

The output signal of each receiving transducer is applied to a separate receiver. The output signal of the receiving transducer comprises an electrical A.C. signal with a frequency corresponding to that of the transmitted signal. This signal is applied to a tuned amplifier 27 which both amplifies the received signal and discriminates, by means of its various tuned circuits, against other undesired signals at other frequencies. The output signal of the tuned amplifier 27 is applied to a rectifier-filter 28 whose function is to rectify the alternating output signal of the tuned amplifier 27 so that a unidirectional signal is obtained and then to filter out the higher frequency components of the rectified signal, leaving only a direct current signal whose waveshape generally corresponds to the envelope of the output signal provided by the tuned amplifier 27.

The output signal of the rectifier-filter 28 is in the form of a positive-going gating voltage, and this is applied to the input of both the gated vehicle reflection amplifier 29 and the gated virtual reflection amplifier 30. If the output signal of the rectifier-filter 28 occurs at a time when the vehicle reflection gate generator 24 is providing its positive gating voltage in the manner shown in FIG. 3, then this gated amplifier 29 is able to produce an output signal in response to the signal obtained from the rectifier-filter 28. However, if the output signal from the rectifier-filter 28 occurs at any other time, when the gating voltage obtained from the vehicle reflection gate generator 24 is at its normal low level, then no output signal can be obtained from the gated vehicle reflection amplifier 29. The gated virtual reflection amplifier 30 operates similarly so that it provides an output signal in response to the output of the rectifier-filter 28 only when such occurs during the time of the virtual reflection gate shown in FIG. 3.

The vehicle relay control circuit 31 included in the receiver for lane R therefore receives repetitive input pulses whenever there is a vehicle in lane R within the detection zone so that each output signal of the transmitting transducer TR is received by the receiving transducer RR on the same side of the highway and with the reflected pulse being received relatively quickly after its transmission as compared to the normal condition when each received pulse must be propagated across the width of the highway from the opposite transducer unit. Under the latter conditions, each output of the rectifier-filter 28 will occur at a time when the virtual reflection gate is in effect so that repetitive output signals are produced by the gated virtual reflection amplifier 30.

Therefore, when no vehicle is present within the detection zone of lane R, the virtual reflection relay control circuit 37 continually receives input pulses, one corresponding to each transmitted sound pulse, and this causes relay RG to be dropped away as will later be described in detail. On the other hand, the vehicle relay control circuit 31 receives no input pulses under these circumstances so that relay RV is then picked up. Therefore, both front contact 46 of relay RG and back contact 47 of relay RV are open so that a circuit cannot be completed through the counter R from the (+) terminal, and through these contacts 46 and 47 in series, to the (—) terminal.

However, when a vehicle is in the detection zone of lane R, the conditions described above are reversed. The vehicle relay control circuit 31 then receives repetitive input pulses, one for each transmitted sound pulse, so that relay RV is dropped away. On the other hand, the virtual reflection relay control circuit 37 then does no treceive input pulses so that relay RG is picked up. Both front contact 46 and back contact 47 of these two relays are then closed so that an obvious circuit through these contacts in series is closed to energize the counter R.

The circuit for the energization of relay RV includes, in parallel, both front contact 45 of this relay and back contact 44 of relay RG. Because of this, once relay R has become dropped away as a result of the passage of a vehicle through the detection zone, it can be restored to its normal condition only if relay RG first drops away to close back contact 44. This ensures that for conditions to be restored to normal, not only must vehicle reflections cease, but also virtual reflections must again occur so that relay RG can drop away and provide a pick-up circuit for relay RV. As disclosed in detail in the aforesaid application Ser. No. 808,736, this interlocking of the relays RG and RV provides considerable immunity against inaccurate vehicle registration. A specific example of such immunity occurs when a vehicle passes through the sound beam but, because of certain characteristics of the vehicle, it does not continually provide sound pulse reflections. Let us assume instead that although the sound pulses are properly reflected from a surface of the vehicle at its front end and again from another surface at its rear end, they are not reflected from a middle portion of the vehicle. If it were not for the interlocking of the relays, relay RV after first dropping away, would again be restored to its picked-up state upon the interruption of the vehicle reflections. Later, it would again drop away when the reflections are again received. Therefore, the circuit for the energization of counter R would be closed twice by a single vehicle since the blocking effect of the vehicle would maintain relay RG picked up. However, by requiring that relay RG drop away before relay RV can pick up, a momentary lapse of vehicle reflections occurring when there has been no restoration of the virtual reflections, cannot produce an actuation of the counter.

The gated detection and relay control circuits described above in general terms are shown in detail in FIG. 5. Each output pulse of the rectifier-filter 28 is applied simultaneously to the grids of tubes V5G and V5V. The plates of these gated tubes are directly connected, through the respective resistors 38 and 39, to the outputs of the virtual reflection gate generator 26 and the vehicle reflection gate generator 24, respectively. Each negative-going output pulse of the rectifier-filter 28 drives the grid of each tube V5G and V5V to a negative cut-off potential with respect to its cathode. Actually, each tube is capable of being cut-off by such grid signal and providing high plate potential only if its plate is then receiving a positive voltage from the corresponding gate generator 26 or 24. More specifically, if it is assumed that a negative pulse is applied to the grid of tube V5G at a time when this tube is conducting because it is then receiving a positive gating voltage from the virtual reflection gate generator 26, tube V5G will then be momentarily cut off. Then there will not be any voltage drop across its plate resistor 39 so that the plate voltage will abruptly rise. On the other hand, if a negative pulse appears at the grid of this tube when it is not receiving any plate voltage from gate generator 26, there will then be no change in plate potential. By analogy, this description applies equally well to the operation of tube V5V.

Because of the operation of the two gate generator circuits 24 and 26 described previously, tubes V5G and V5V are gated at different times so that, for each output pulse of rectifier-filter 28, only one of them can supply a positive pulse to the grid of the following tube V6G or V6V of sufficient amplitude to overcome the normal cut-off bias resulting from the connection of its cathode to the junction of voltage-dividing resistors 18 and 19 connected in series between (B+) and ground. When either tube has its bias voltage overcome in this way, it conducts with a resulting abrupt drop in its plate voltage. From this description, one can understand that each pulse of ultrasonic energy received by a receiving transducer at the time of the virtual reflection gate results in a negative pulse at the plate of tube V6G. Similarly, each pulse of ultrasonic energy received by such transducer when the vehicle gate is in effect produces a negative pulse at the plate of tube V6V.

Each time that the voltage at the plate of tube V6G abruptly decreases in amplitude, capacitors 32 and 33 are negatively charged through diode 35. Since capacitor 32 is considerably smaller than capacitor 33, a major portion of the total negative voltage appears across the smaller capacitor 32. When the voltage at the plate of tube V6G rises again to its normal level, diode 35 immediately becomes non-conductive, but diode 34 then conducts thereby maintaining the right-hand terminal of capacitor 32 at ground potential. At such time, the negative voltage on capacitor 33 discharges through resistors 36 and 48. However, the amount of voltage lost between successive input pulses in relatively small as compared to the amount of negative voltage added by each such pulse.

The occurrence of each negative pulse at the plate of tube V6V thus adds a small increment of negative voltage to capacitor 33, and eventually the voltage at its upper terminal becomes sufficiently negative so that normally conductive tube V7G is cut off, and when this happens, relay RD drops away. When the repetitive pulses at the plate of tube V6G cease, capacitor 33 discharges exponentially until finally tube V7G again is restored to its normal conductive state so that relay RG in its plate circuit will pick up.

The circuit for the control of relay RV operates in exactly the same manner. Since, with no vehicle present, pulses normally do not appear at the plate of tube V6V, tube V7V is normally fully conductive so that relay RV is picked up. When a vehicle is present, the vehicle reflection pulses which occur cause tube V7V to cut off so that relay RV drops away.

*Embodiment of FIG. 6*

In describing this invention as particularly disclosed in the embodiment illustrated in FIG. 2, it was pointed out that it is possible to register independently two vehicles passing simultaneously between the transducer locations located respectively on opposite sides of the highway. Under these circumstances, each transmitting transducer has its output impinging upon the vehicle in the adjacent lane, and the reflections of the respective sound beams are then received by the associated receiving transducers. However, whenever there is only one vehicle between the opposite transducer locations, only one of the sound beams is required to register the presence of the vehicle. For example, referring to FIG. 1B, when only the single vehicle 16 is present between transducer units 9 and 10, the fact that the sound beam emanating from transmitting transducer TR is received after a brief interval by receiving transducer RR is what results in the registration of the vehicle's presence. It is of no real consequence under these circumstances that the sound beam emanating from transducer TL is then received by the associated receiving transducer RL. The beam passing between the transducer units TL and RL is of effect only when there is a second vehicle in addition to vehicle 16 between the transducer units 9 and 10.

When it is only desired to detect the passage of vehicles passing along a single lane, it is possible to use the somewhat simplified embodiment of this invention illustrated in FIG. 6. In this embodiment, only a single transmitting transducer is employed. This transmitting transducer has an associated receiving transducer adjacent it on the same side of the highway. Directly opposite these, on the opposite side of the highway, only a single receiving transducer is employed and no associated transmitting transducer. This is diagrammatically illustrated in FIG. 6 where it is indicated that the receiving and transmitting transducers RR and TR, respectively, are positioned along one side of the highway and with a single receiving transducer RL positioned opposite them on the opposite side of the highway. These transducers are so positioned and directed that the sound beam emanating from the transmitting transducer TR is received, in the absence of any vehicle, by the receiving transducer RL. But, when a vehicle is present and intercepting this beam, the sound pulses originating with the transducer TR are then reflected toward and received by the transducer RR.

Both the receiving transducers RL and RR supply their outputs to a common receiver which has in its input a hybrid network 50 which permits the two receiving transducers to be connected in parallel without interaction. Assuming that the various dimensions illustrated in FIGS. 1B and 1C are applicable as well to this embodiment of the invention, when no vehicle is present each sound pulse transmitted by the transducer TR is received by transducer RL after a time interval equalling $2t_1$. Consequently, the tuned amplifier 51 receives an input from transducer RL and through the hybrid network 50 at a time following its transmission which is the same as if the transmitted pulse were reflected instead from a fixed reflecting surface midway between the opposite transducer locations toward the receiving transducer RR which is adjacent the transmitting transducer.

As with the embodiment of FIG. 2, each successive output pulse of the pulse generator 52 initiates operation of the various gating circuits so that a vehicle reflection gate is generated to demarcate the interval within which a vehicle reflection pulse can be expected following the transmission of each sound pulse and also a virtual reflection gate which encompasses the expected time of arrival of a pulse from the transmitting transducer on the opposite side of the highway. The vehicle reflection gate is applied over wire 12 of the gated vehicle reflection amplifier 56, and the virtual reflection gate is similarly applied over wire 11 to the gated virtual reflection amplifier 53.

When no vehicle is present each sound pulse received by transducer RL occurs at a time approximately $2t_1$ after its generation. It thus falls within the time of the virtual reflection gate so that amplifier 53 but not amplifier 56 will produce an output pulse in response to the corresponding pulse obtained from rectifier-filter 8. Each such sound pulse received by transducer RL causes an electrical pulse to be applied to the virtual reflection relay control circuit 55, and the continued occurrence of these pulses causes relay G to be dropped away. The manner in which relay G is controlled has already been described in connection with FIG. 5.

When a vehicle intercepts the single sound beam normally passing between transducers TR and RL, transducer RL is blocked from receiving any sound pulses whatsoever. Because of this, relay G picks up. Transducer RR now receives reflections of the transmitted sound pulses from the surface of the vehicle. Since there is only the single lane, the distance between the vehicle and the transducers TR and RR is less than half of the entire distance between transducers RL and TR so that the propagation time of the pulses travelling between transducers TR and RR is less than $2t_1$. Consequently, following the transmission of each sound pulse, tuned amplifier 51 now receives a reflection pulse prior to the time in which it would ordinarily receive a reflection pulse from transducer RL if no vehicle were present.

The vehicle reflection gate which is applied to the gated vehicle reflection amplifier 56 and is obtained from the vehicle reflection gate generator 57 is timed so as to encompass the expected arrival time of such pulses reflected from the vehicle. Amplifier 56 is therefore able to provide an output pulse for each such vehicle reflection pulse. The continued occurrence of such vehicle reflection pulses, each occurring within the time of the vehicle reflection gate, causes the gated amplifier 56 to supply repetitive output pulses to the vehicle relay control circuit 58, and when this happens, relay V drops away. Of course, when no vehicle is present within the sound beam, there are no input pulses applied to amplifier 56 throughout each occurrence of the vehicle gate so that the relay control circuit 58 receives no input pulses and relay V is picked up.

From this description, it is apparent that whereas relay V is normally picked up and relay G dropped away so that the back contact 59 and front contact 60 of these relays are both normally open, the opposite conditions prevail when a vehicle is present with the result that a circuit is then closed to energize counter 61 and thereby register the passage of the vehicle. An interlocking circuit is provided for relay V including the front contact 62 of relay V and back contact 63 of relay G. As previously described, this prevents the restoration of relay V until relay G has again dropped away upon restoration of the beam between transducers RL and TR.

*Embodiment of FIG. 7*

In the above description of the embodiment of FIG. 6, it was disclosed that the outputs of the two receiving transducers on opposite sides of the lane were applied to a single receiver. Time gating was employed to distinguish the sound pulses normally received by transducer RL when no vehicle is present from the reflection pulses received by transducer RR when a vehicle intercepted the beam. Because of this, it was necessary that each vehicle pass closer to the location of the transducers RR and TR than the midpoint between the opposite transducers RL and TR. Only in that way would a vehicle reflection pulse have a total propagation time less than $2t_1$ and thus be distinguishable from a sound pulse travelling between transducers TR and RL.

In contrast with this, the embodiment of FIG. 7 eliminates the need for time gating to differentiate between the sound pulses received by transducers RL and RR. This makes it possible to eliminate entirely the various gating circuits shown in FIG. 6. The reason that they may be eliminated is that the outputs of the respective receiving transducers RL and RR are applied to separate receivers. Thus, the direct sound pulses received by transducer RL when no vehicle is present are applied to a receiver comprising tuned amplifier 83, rectifier-filter 84, virtual reflection amplifier 85, and virtual reflection relay control circuit 86. From the description previously given, it will be understood that each such sound pulse received by transducer RL will cause an electrical pulse to be applied to control circuit 86 and that a succession of such pulses will cause relay G to drop away. Similarly, when a vehicle is present, each vehicle reflection sound pulse received by transducer RR will produce an input pulse to control circuit 90, and a succession of these likewise causes relay V to drop away.

Normally therefore, relay V is picked up and relay G dropped away so that no circuit can be established through the front contact 91 of relay G and back contact 92 of relay V to energize the counter. However, when a vehicle blocks the sound beam normally transmitted across the highway, these relays each reverse their conditions so that an obvious circuit can be established through these contacts 91 and 92 to energize the counter.

Incidentally, in this embodiment of FIG. 7, the sound pulses are generated in the usual way by an oscillator 81 which is repetitively triggered to generate an output pulse by pulse generator 80 and whose output is suitably amplified by power amplifier 82.

Since there is no time gating employed to differentiate between the pulses received by the transducers RL and RR respectively, it then becomes immaterial whether the sound pulse received by transducer RR when a vehicle is present has a propagation time shorter than that required for a pulse to travel between transducers TR and RL when no vehicle is present. This means that a vehicle travelling along the lane and intercepting the beam can be more distant from the site of the transducers RR and TR than the midpoint between transducers TR and RL. This brings about an added advantage in that the detection system of this embodiment of the invention may equally well be used to detect vehicles moving along a highway having a plurality of lanes. That is, any vehicle will be properly detected as long as it intercepts the beam so that transducer RL will not receive direct sound pulses from the transmitting transducer TR and as long as the vehicle is able to reflect such pulses back to the transducer RR on the same side of the highway as the transmitting transducer. Even where there are several lanes between the opposite transducer locations, a vehicle passing along the highway and through the beam will be able to accomplish this regardless of which lane it is in. Of course, if two vehicles simultaneously intercept the sound beam, they will not be separately detected and counted as can readily be accomplished with the embodiment of the invention shown in FIG. 2. However, there are numerous occasions when this is not required. For example, it is frequently desirable to detect the approach of a vehicle to an intersection so that the traffic lights may be controlled in accordance with the approach of such vehicle. Where there are two or more lanes of traffic moving in the same direction toward such an intersection, it is only necessary that the approach of any one vehicle be detected and it is of no concern that more than one vehicle may simultaneously be approaching the intersection. In that event, the invention as disclosed in FIG. 7 will properly detect the passage of a vehicle through the sound beam.

This form of the invention is decidedly superior to that known in the prior art where a sound beam is directed across the highway and is normally received by a receiving transducer on the opposite side of the highway and where the vehicle is detected merely by reason of the non-reception of such sound pulses. In such a system, any cutting off of the sound beam as by the presence of a person walking through it, for example, will produce an erroneous vehicle detection signal. Such operation cannot occur with the system shown in FIG. 7 since it is not merely the cutting off of the normally received beam that effects vehicle detection, but it is also required that the receiving transducer on the same side of the highway receive a reflection signal and such reflection signal will ordinarily not be obtainable from a person passing through the sound beam.

At the same time, the invention of FIG. 7 is superior as well to the known systems of the prior art wherein a vehicle's presence is detected by transmitting a sound beam across the highway and positioning a receiving transducer adjacent the transmitting transducer so that when a vehicle appears, the receiving transducer will receive a reflection signal. When a system of this kind is used, the presence of a vehicle is detected merely by the reception of such reflection signal and if the passing vehicle is of such a character that it produces a momentary loss of the reflection signal, but with the reflection signal subsequently returning, then such single vehicle may actually be registered as two or more vehicles. In contrast, the invention of FIG. 7 guards against such possibility since it is required that not only must the reflection signal cease but the opposite transducer must again receive the beam of sound pulses before conditions can be restored to normal so that a subsequent vehicle can be registered. Any momentary loss of the reflection signal will therefore not result in erroneous operation. This particular safeguard results from the interlocking of the relays G and V provided by contacts 93 and 94 whose operation has previously been described.

In describing the embodiment of this invention illustrated in FIG. 2, it was mentioned that when a vehicle intercepts the sound beams while passing along one lane of the dual lane highway of FIG. 1B, the sound beam emanating from the transmitting transducer on the opposite side of the highway is then received by its associated receiving transducer with a delay time which may be substantially greater than the time required for it to receive a pulse from the opposite transmitting transducer when no vehicle is present. In other words, referring to FIG. 1B, whereas receiving transducer RL receives a sound pulse when no vehicle is present at a time $2t_1$ following the transmission of each sound pulse, when vehicle 16 is present in lane R, transducer RL will then receive a reflection pulse from the near side of such vehicle with a delay time substantially in excess of $2t_1$ and this longer time is represented by $2t_2$. Because of this, it is necessary to slow the repetition rate of the system so that successive pulses will be separated by an interval at least equal to this time $2t_2$ as clearly illustrated at line A of the waveform diagram of FIG. 3. As already explained, if this were not done, such a delayed pulse would be received at a time subsequent to the time when the next sound pulse had already been transmitted and it might then well be received at a time when the vehicle reflection gate had again come into existence in response to the transmission of such next sound pulse. Under those circumstances, this greatly delayed sound pulse would appear as a bona fide vehicle reflection signal. However, by instead delaying the repetition rate of the system, this delayed sound pulse will be received by the receiving transducer at a time subsequent to the termination of the virtual reflection gate and before the transmission of the next sound pulse so that it will be completely rejected.

Under some circumstances, it may be a disadvantage to slow the repetition rate of the system in order to provide this rejection of such delayed and unwanted reflection pulses. One reason for this is that a slowing of the system's repetition rate means that fewer pulses will impinge upon each vehicle as it passes through the sound beam at a given speed. Therefore, a vehicle travelling at high speed may have so few sound pulses impinging upon its sound reflecting surfaces that it cannot be detected.

When it is desired to have a high pulse repetition rate for these reasons, it is proposed that the embodiment of FIG. 8 be employed. In this embodiment of the invention, the transmitter transmits pulses alternately at different frequencies which have been designated for convenience as $f1$ and $f2$, respectively. When the common transmitter has caused the opposing transmitting transducers each to transmit a sound pulse at frequency $f1$, for example, each receiver is thereafter responsive only to received sound pulses which are of this frequency $f1$. This condition persists until the transmitter transmits the next sound pulse will be at the other frequency $f2$. At that instant, each receiver becomes non-responsive to any further reflections received at the frequency $f1$ and instead is then responsive only to reflections whose frequency is $f2$. Therefore, it becomes possible to speed up the repetition rate of the system so that the time between successive pulses will be only very slightly in excess of $2t_1$. In other words, when sufficient time has elapsed following the generation of each sound pulse for that pulse to be received by the receiving transducer on the opposite side of the highway, a subsequent sound pulse may be transmitted. Under these circumstances, if a vehicle 16 is present in lane R (see FIG. 1B), each sound pulse emanating from the transmitting transducer TL and having the frequency $f1$, for example will, it is true, be received by transducer RL at a time when the next succeeding sound pulse (at frequency $f2$) has already been transmitted by transducer TL. However, the receiving circuits associated with transducer RL will, at such time be responsive only to received sound pulses whose frequency is $f2$ and will therefore, in effect, recognize that such greatly delayed pulse is not a reflection of the last-transmitted pulse because it is not of the frequency $f2$ but is instead of the frequency $f1$.

In the various other modifications of the invention disclosed, it has been desirable to employ pulsed sound energy in order to aid in distinguishing the directly transmitted sound beam from the vehicle reflected beam. The use of pulsed sound energy facilitated this matter in that it permitted such distinction to be made on the basis of selective time gating. According to the system shown in FIG. 7, however, such distinction is unnecessary so that a steady sound beam may be employed. The minor changes required in the system of FIG. 7 to adapt it to transmission of a steady sound beam are believed to be obvious to one skilled in the art.

Referring to the block diagram of FIG. 8, the common transmitter illustrated therein is substantially identical to that of FIG. 2. One distinction is that each output pulse of the pulse generator is applied to a flip-flop 65 whose output is applied over wire 66 to the frequency shift oscillator 67. The flip-flop 65 is of a conventional type, being a bi-stable state device which is operated between its alternately opposite conditions by each successive output of the pulse generator 74. Whenever the pulse generator 74 has operated the flip-flop 65 to a particular one of its two opposite conditions, a voltage appears on wire 66 which acts upon the oscillator 67 so that the signal it generates in response to the triggering input from pulse generator 74 will be shifted in frequency from the value $f1$ to a different value $f2$. The next output pulse of the pulse generator 74 operates the flip-flop 65 back again to the opposite condition at which time the voltage on wire 66 will be removed so that the next output signal of the shift oscillator 67 will then be at frequency *f1*. If desired, the generation of each sound pulse may be delayed slightly with respect to the triggering input obtained from pulse generator 74. This will ensure that flip-flop 65 has already operated and effected the shift in the frequency characteristic of oscillator 67. In this way, successive output pulses provided by the shift oscillator 67 are made to occur alternately at the two different frequencies *f1* and *f2*.

Whenever the flip-flop has been operated to the condition where it provides the voltage on wire 66 so that shift oscillator 67 will generate an output pulse at frequency *f2*, a gating voltage will at the same time appear on wire 68 and be applied to the gated tuned amplifier 69 and 70. One the other hand, when the flip-flop is in the opposite condition so that no output voltage appears on wire 66 so that shift oscillator 67 then provides its output pulse at frequency *f1*, then a gating voltage appears instead on wire 71 and is applied to the gated tuned amplifiers 72 and 73.

In the interval following the transmission of a pulse at frequency *f1* and until the transmission of the next pulse which is then at frequency *f2*, only the gated amplified for each receiver that is tuned to the frequency *f1* is gated so that it can amplify a signal which it receives from its associated receiving transducer. Similarly, in the next interval following the transmission of a pulse at frequency *f2*, it is only that particular gated amplifier for each receiver which is responsive to signals at frequency *f2* that is gated so that it can amplify a signal provided by its associated receiving transducer. Thus, in this interval following the transmission of a sound pulse at frequency *f2*, if a reflection pulse should be received by receiving transducers RR or RL at the frequency *f1*, this pulse would not affect the output circuit of either receiver. For example, a pulse received by transducer RR could not be suitably amplified by either of the amplifiers 69 or 72 even though it is applied to both of them. Amplifier 72 could not respond because it is not gated at such time over wire 71. As to amplifier 69, this amplifier is then gated over wire 68 but its tuning characteristics cause it to discriminate against signals at frequency *f1*. Consequently, neither of these amplifiers will supply an output pulse to the rectifier-filter 75 for such received sound pulse at frequency *f1*. During this same interval, a sound pulse at frequency *f1* received by the other receiving transducer will likewise be rejected by the receiver associated with this receiving transducer. In other words, there is only a limited time throughout which each receiver will be responsive to reflections of the last occurring sound pulse that was transmitted and upon the occurrence of the next transmitted sound pulse, each receiver will thereafter not respond to any reflections resulting from such prior pulses. Such reflections from prior pulses will consequently not be erroneously identified as a bona fide reflection signal from the last-transmitted pulse.

Having described a vehicle detection system of the kind in which at least one beam of repetitive sound pulses is transmitted across the path of the vehicles and normally impinges upon receiving means on the opposite of said path when no vehicle is present but is instead reflected back by the vehicle toward receiving means on the same side of the path when such vehicle is present, I wish it to be understood that the various embodiments of my invention shown are merely typical of those which might be constructed and yet come within the scope of my invention as defined in the appending claims:

1. In a system for detecting vehicles as they pass along a pathway and through a detection zone defined by at least one energy beam, at least one energy transmitting means including a transmitting transducer positioned alongside the path to be traversed by said vehicle for transmitting said beam across said path to thereby define said detection zone, first receiving means including a receiving transducer positioned on the opposite side of said path for receiving and being distinctively controlled by said beam transmitted from said transmitting means when no vehicle is present, second receiving means also including a receiving transducer positioned on the same side of said path as said transmitting means for receiving and being distinctively controlled by the reflection of said beam from a vehicle intercepting said beam while passing through said zone, and registering means governed jointly by said first and second receiving means and so constructed as to be controlled to a vehicle registering condition only when said second receiving means have been distinctively controlled by the reception of said reflected beam and concurrently therewith said first receiving means is no longer distinctively controlled by reception of said beam by reason of its interruption by said vehicle.

2. The system as defined in claim 1 wherein each energy beam comprises a stream of repetitive sound pulses.

3. The system as defined in claim 1 wherein said registering means is further organized so as to register said vehicle and thereafter be restored to a condition wherein it can subsequently register another vehicle only when both said first and second receiving means are controlled to the conditions they normally assume when no vehicle is in said detection zone so that said first but not said second receiving means is receiving said energy beam.

4. In a system for detecting vehicles as they move along a highway and pass through a detection zone defined by at least one energy beam transmitted across said highway in such a manner as to permit its interception by each said vehicle the combination comprising, transmitting means including a transmitting transducer for transmitting said beam, first receiving means including a receiving transducer being positioned and directed so as to receive said beam subsequent to its travel across said highway when no vehicle is in said detection zone, second receiving means also including a receiving transducer being so positioned and directed as to receive said beam only upon its reflection from said vehicle when it intercepts said beam, each said receiving means when it receives said beam being distinctively controlled thereby, and registering means being controlled by both said first and second receiving means and registering said vehicle only provided that concurrently said second receiving means has been distinctively controlled by said reflected beam but said first receiving means has not been distinctively controlled by said beam travelling across said highway.

5. In a system for detecting vehicles as they move along a highway and pass through a detection zone defined by at least one energy beam transmitted across said highway in such a manner as to permit its interception by each said vehicle the combination comprising, transmitting means including a transmitting transducer for transmitting said beam in the form of repetitive pulses, first receiving transducer means being positioned and directed so as to receive said beam subsequent to its travel across said highway when no vehicle is in said detection zone, second receiving transducer means being so positioned and directed as to receive said beam only upon its reflection from said vehicle when it intercepts said beam, said first and second receiving transducer means being so positioned relative to each other and relative to said transmitting transducer that a energy pulse travelling to said first receiving transducer when no vehicle is in said detection zone has a substantially different propagation time than a pulse received by said second receiving transducer means as a result of reflection from said vehicle when in said detection zone, comon receiving means having the output signals of both said first and second transducers applied thereto and providing a distinctive output signal for each pulse received by either said first or said second transducer, first and second gated amplifier circuit means each having the output of said common receiving means applied thereto, timing circuit means demarcating predetermined time intervals following the transmission of each pulse and controlling said first gated amplifier means to produce an output only in response to an input thereto occurring during an interval encompassing the expected time of arrival of a pulse travelling uninterruptedly across said highway and received by said first receiving transducer means, said timing circuit means controlling said second gated amplifier means to produce an output only in response to an input thereto occurring during an interval encompassing the expected time of arrival of a pulse reflected from said vehicle and received by said second receiving transducer means, and registering means being controlled to register a vehicle only provided that concurrently said second gated amplifier means is producing repetitive outputs but said first gated amplifier means is not producing repetitive outputs.

6. In a system for registering a vehicle as it moves along a multiple lane highway and passes through a detection zone defined by at least two energy beams each comprising a stream of repetitive pulses and directed in generally opposite directions across said highway in such a manner as to be intercepted by said vehicle as it moves along said highway the combination comprising, transmitting means for transmitting each of said beams, first and second receiving means each including a receiving transducer being positioned and directed to be responsive to a respective one of said beams only when it has travelled across said highway and not been intercepted by any vehicle but each being also responsive to the reflection of said other beam from a vehicle intercepting such other beam, whereby each pulse received by a receiving transducer has a predetermined first propagation time if it travels uninterruptedly across said highway but has a propagation time when reflected from a vehicle in said detection zone varying in accordance with the lane of said highway over which said vehicle travels, timing circuit means for each receiving means providing distinctive outputs demarcating respectively a first time interval encompassing the expected time of arrival at the associated receiving transducer of each pulse of said one beam travelling uninterruptedly across said highway and a different second time interval encompassing the expected time of arrival at the associated receiving transducer of each pulse of said other beam following its reflection from a vehicle travelling in a selected lane, first and second output means for each said receiving means being governed by said timing circuit means and each providing an output signal only in response to pulses received by the associated receiving transducer during said respective first and second time intervals, and vehicle registering means connected to each receiving means and registering a vehicle only provided that said second output means has provided said output signal repeatedly and concurrently therewith said first output means has not provided said output signal for at least a predetermined interval.

7. In a system for registering vehicles as they move along a defined path and pass through a detection zone demarcated by at least two energy beams directed in generally opposite directions across said path in such a manner as to be interrupted by each vehicle, transmitting means for each said beam including a transmitting transducer adjacent each side of said path for transmitting said beam in the form of repetitive pulses across said path, receiving means including a receiving transducer adjacent each transmitting transducer and being so positioned and directed as to receive both the direct pulses travelling uninterruptedly across said path when no vehicle is in said zone and also the reflection pulses which originate with the transmitting means on the same side of the highway and are reflected from a vehicle in said zone, timing means connected to each receiving means for causing said receiving means to supply a first kind of output signal for each pulse received during a preselected interval encompassing the expected time of reception by the associated transducer of each said direct pulse and causing it to supply a second kind of output signal for each pulse received during a different interval terminating prior to the beginning of said preselected interval, and registering means connected to each receiving means and being operated to a vehicle registering condition only when said receiving means has for at least a predetermined interval not supplied said first kind of output but has concurrently therewith supplied said second kind of output, whereby two vehicles passing contemporaneously through said detection zone alongside each other are both independently registered by said registering means for the respective receiving means.

8. The system as defined in claim 7 wherein each registering means completes a cycle of operation to register a single vehicle and is thereafter restored to a condition permitting its subsequent operation to register another vehicle only when the associated receiving means again supplies said first kind of output but does not supply said second kind of output.

9. The system defined in claim 7 wherein said transmitting means for the respective beams transmit the successive pulses in substantial synchronism, each transmitted pulse comprises a pulse of sound energy.

10. The system of claim 9 wherein said timing means is provided in common for the different receiving means and is set into operation at the time each pulse is transmitted by each said transmitting means.

11. The system of claim 9 wherein the transmitting transducer of each transmitting means is energized from a common source of repetitive pulses.

12. The system as set forth in claim 9 in which each receiving means includes first and second gated amplifiers each having applied to its input an electrical signal for each pulse received by the associated receiving transducer, said timing means providing a gating voltage to said first gated amplifier throughout said preselected interval and also providing a gating voltage to said second gated amplifier throughout said different interval, said first and second gated amplifiers respectively producing said first and second kinds of output only when said electrical signal applied thereto occurs at a time when it is receiving said gating voltage.

13. A system for detecting the presence of vehicles as they travel along a roadway and through a detection zone demarcated by at least two beams of repetitive energy pulses travelling in generally opposite directions across said roadway in a manner that causes them to be intercepted by each passing vehicle, transmitting means for each beam including a transducer positioned adjacent an edge of said roadway and causing said successive pulses to be transmitted by the opposite transmitting transducers substantially simultaneously, receiving means for each side of said roadway and including a receiving transducer being so positioned and directed that it will receive one said beam from across said highway when no vehicle is present and will also receive the reflection of the other beam from a vehicle when such vehicle is intercepting the other beam, said transmitting means for each beam causing successive pulses thereof to be alternately at two different frequencies, each said receiving means including a frequency discriminatory means for each frequency and being alternately made effective so that in the interval following the transmission of a pulse of a particular frequency and until the transmission of the next pulse at a different frequency each frequency discriminatory means can provide an output signal only for each received sound pulse having said particular frequency, timing means for each receiving means for causing said receiving means to supply respectively different outputs for each pulse of said one beam travelling uninterruptedly across said roadway and for each pulse of said other beam reflected from said vehicle when intercepting said beams and having a shorter propagation time than said pulses travelling uninterruptedly across said roadway, and vehicle registering means for each receiving means and controlled according to said respectively different outputs so as to register a vehicle's presence only when there has concurrently occurred the conditions wherein said pulses are no longer received by the associated receiving transducer from the opposite side of said roadway but said sound pulses from the transmitting transducer on the same side of the roadway are instead received, whereby pulses received by said receiving means and having a propagation time greater than said pulses travelling uninterruptedly across said roadway are rejected by both said frequency discriminating means and are thus ineffective to produce an output from said receiving means.

14. The system of claim 13 wherein said transmitting transducer included in each transmitting means is energized by a common pulse generating means, said sound pulse generating means including pulsing means for generating repetitive electrical pulses whose frequency establishes the repetition rate of the transmitted sound pulses, a bistable state device being operated alternately between its two opposite states by successive ones of said electrical pulses, said pulse generating means including an oscillator being controlled jointly by said pulsing means and said bistable state device to generate successive electrical pulses of alternately different frequencies, said bistable state device being connected to said frequency discriminatory means for the respectively different frequencies to make them alternately effective to reject signals at the respective frequencies.

15. The combination of claim 13 wherein each receiving means includes first and second gated amplifiers and said timing means providing first and second gating voltages which respectively demarcate one time interval following the transmission of each pulse encompassing the expected arrival time of a pulse travelling uninterruptedly across said roadway and also a second time interval expiring prior to the beginning of said one time interval, said gating voltages being applied to said first and second gated amplifiers respectively to thereby cause each to provide an output signal only for outputs of said frequency discriminating means occurring during the existence of said gating voltage applied thereto, said registering means registering the presence of a vehicle only when there has been a cessation of output signals from said first gated amplifier and concurrently therewith the repeated occurrence of said output signals from said second gated amplifier.

16. A vehicle registering system comprising in combination, means for transmitting a beam of energy across the path of said vehicle so as to impinge thereon when said vehicle is present, receiving means including a first means positioned and directed to receive said beam only in the absence of said vehicle and including a second means positioned and directed to receive a reflection of said beam from the reflecting surfaces of said vehicle when it is present, whereby said first means receives said beam only when said vehicle is not within said beam but said second means receives said reflection of said beam only when said vehicle is within said beam, and vehicle registering means governed by said receiving means and being controlled from its normal condition only when said second means receives said beam while simultaneously said first means does not receive said beam and being thereafter restored to its normal condition only when said first means again receives said beam while simultaneously said second means does not receive said beam to thereby effect the registration of said vehicle.

References Cited in the file of this patent

UNITED STATES PATENTS

| | | |
|---|---|---|
| 1,982,341 | Hitchcock | Nov. 27, 1934 |
| 2,965,893 | Barker | Dec. 20, 1960 |